April 17, 1956     H. P. BOVENKERK     2,742,385
INSULATED STRUCTURES
Filed June 14, 1952
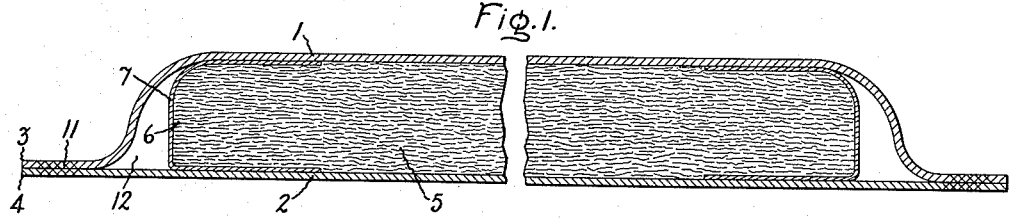
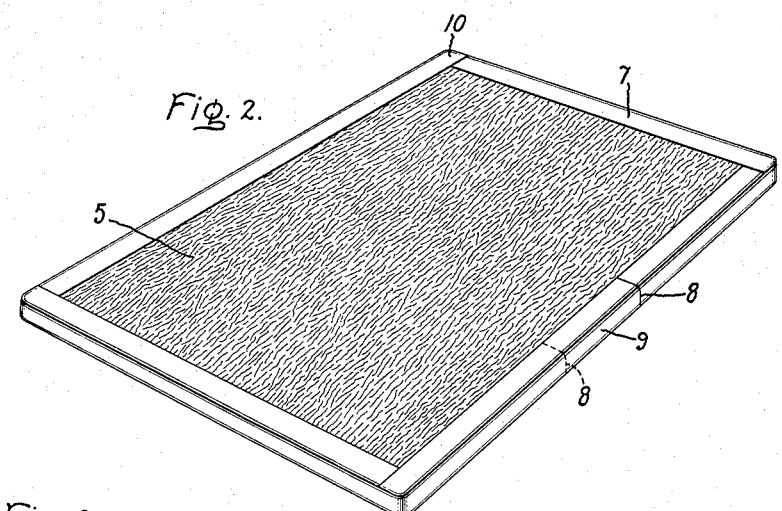
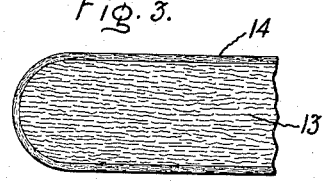
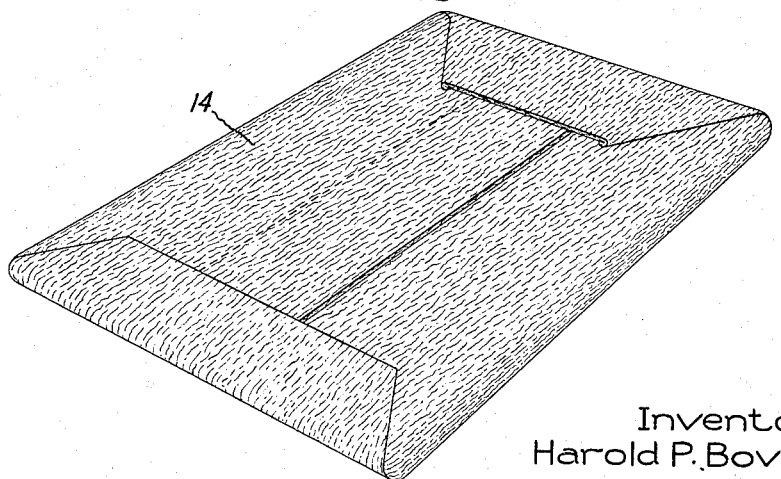
Inventor:
Harold P. Bovenkerk,
by *Sheridan...*
His Attorney.

United States Patent Office 2,742,385
Patented Apr. 17, 1956

2,742,385
INSULATED STRUCTURES

Harold P. Bovenkerk, Ballston Lake, N. Y., assignor to General Electric Company, a corporation of New York Application June 14, 1952, Serial No. 293,595

2 Claims. (Cl. 154—45)

My invention relates to vacuum insulated structures, and more particularly to arrangements for facilitating satisfactory manufacture thereof.

Vacuum insulated structures may be advantageously employed in the walls of household refrigerators and the like because the improved thermal insulating properties make possible the use of thinner walls and hence greater interior space. Vacuum insulated structures or panels such as those described and claimed in the copending application of Herbert M. Strong and Francis P. Bundy, Serial No. 236,788, filed July 14, 1951, and assigned to the assignee of the present invention, are particularly advantageous for such purposes because of the very low thermal conductivity achieved. These insulating structures include two spaced walls welded together at their edges to provide a sealed envelope, and a filler material within the envelope for supporting the walls against external atmospheric pressure, this filler material, in the aforementioned Strong and Bundy application, comprising a batt of glass fiber insulation.

In order to maintain the thermal conductivity of such structures at a very low value over long periods of contemplated use, it is necessary that the pressure within the panel be kept below a predetermined maximum. In order to maintain this very low pressure over a long period, it is of course essential that the panel be perfectly sealed. Such a satisfactory seal, in turn, depends upon the securing of a perfect weld between the abutting edges of the two walls forming the panel structure. It has been found that, with the filler material referred to above, small pieces of glass fiber and glass shot may get into the weld area, and the presence of such material in the weld area has a deleterious effect on the weld nugget, increasing the possibility of an imperfect weld and hence the possibility of an imperfect seal. In accordance with my invention, a structure is provided which minimizes the entry of such glass fibers and glass shot into the weld area.

It is an object of my invention to provide, in connection with vacuum insulated structures, an improved arrangement for insuring a satisfactory weld of the envelope of such structures.

It is another object of my invention to provide an improved arrangement for minimizing entry of glass fibers and glass shot from a filler material into the weld area of a sealing envelope of a vacuum insulated structure or panel.

Further objects and advantages of my invention will become apparent as the following description proceeds and the features of novelty which characterize my invention will be pointed out with particularity in the claims annexed to and forming part of this specification.

In carrying out the objects of my invention, the edges of the batt of filler material are wrapped in a relatively thin blanket of very fine glass fiber material formed of fibers having a diameter not exceeding .0002 inch, so that the edges of the batt are enveloped by the fine relatively impervious material.

For a better understanding of my invention, reference may be had to the accompanying drawing in which Fig. 1 is a sectional view of an insulating structure or panel incorporating an embodiment of my invention; Fig. 2 is a perspective view of the filler material of the insulating structure of Fig. 1; Fig. 3 is a sectional view of the portion of a modified filler material arrangement; and Fig. 4 is a perspective view of the filler arrangement shown in Fig. 3.

Referring to Figs. 1 and 2, there is shown an insulating structure or panel comprising spaced walls 1 and 2. The abutting edges 3 and 4 respectively of these walls are adapted to be welded to seal the envelope formed by the walls, so that the low pressure established therein during factory evacuation will be retained over a long period of time.

In order to support the walls 1 and 2 in spaced relationship against the external atmospheric pressure, a batt 5 of filler material is disposed within the space between the walls 1 and 2. This batt of filler material may be, for example, of the type disclosed in the aforementioned Strong and Bundy application, comprising a plurality of glass fibers. The batt 5 is of course highly compressed in supporting the heavy load of external atmospheric pressure, and it has been found that some of the fibers may be broken during such compressive action and the small pieces of fiber may find their way into the weld area. In addition, glass shot present in the filler material may also find its way into the weld area. It has been further found that welds made with the presence of these glass fibers or glass shot in the weld area are not perfect, and there is danger of poor sealing and of leakage into the panel, thereby greatly reducing its insulating value.

In accordance with my invention, an arrangement is provided which minimizes the possibility of entry of such glass fibers or glass shot into the weld area. In the form shown in Figs. 1 and 2, the edges 6 of the batt 5 are enclosed in a strip of flexible relatively impervious material, which specifically may be aluminum foil. A single strip is preferably employed to extend around the entire perimeter of the batt 5, the ends 8 of this strip being overlapped as indicated at 9. The strip is folded at the corner as indicated at 10 to take care of the excess material in these regions.

The impervious aluminum foil strip, by enveloping the edges and the adjacent surfaces of the filler material, blocks the entry of any existing small fibers and glass shot from the filler material into the weld area 11, since the strip 7 is interposed between the filler material and the weld area 11. Accordingly, the possibility of imperfect welds because of the presence of glass fibers and glass shot in the weld area, is minimized.

In addition to the primary purpose for the use of this strip as described above, the employing of the strip 7 of aluminum foil completely surrounding the edges of the filler material and partially overlapping the top and bottom surfaces thereof is advantageous from the standpoint of the handling of the batt during manufacture. Batts of glass fiber insulating material must be handled with some degree of care because of the possibility of irritating the skin by small glass particles. With the structure illustrated in Fig. 2, the hands usually contact only the aluminum foil and the aforementioned irritation is avoided.

The idea of relating the batt and the envelope structure so as to provide a peripheral passage 12 for speeding evacuation is not part of the present invention but is the joint invention of Harold P. Bovenkerk and George C. Doderer and is described and claimed in their copending application Serial No. 301,767, filed July 30, 1952, and assigned to the assignee of the present invention.

In Figs. 3 and 4, there is shown a modified form of the filler material made in accordance with my invention.

The major portion of the filler material, i. e., the relatively thick batt 13 is formed of relatively coarse glass fibers, for example, glass fibers having a diameter from above .0002 to .005 inch. Glass fiber insulating material including fibers of this size has been found susceptible of breakage of some fibers during the high compression resulting from the use of the batts in vacuum insulating structures of this type, and has been further found to contain occasional glass shot. In order to avoid the entry of these glass fibers and glass shot into the weld area 11, the batt 13 is wrapped in a sheet or blanket 14 of an insulating material composed of very fine glass fiber, for example glass fibers having a diameter of about .0002 inch or less. Insulating material formed from fibers of this diameter, when pressed into very thin sheets forms a coherent mass approaching paper or cloth. It has been found that thin sheets or blankets of this material exhibit little tendency toward short fibers or glass shot which might find their way into the weld area 11 and contaminate the weld. By enveloping the batt 13 of relatively coarse fiber material in a thin blanket or strip of a very fine glass fiber insulating material, the entry of small fibers and glass shot from the batt 13 into the weld area is prevented by the relatively impervious blanket 14. Accordingly, the danger of weld imperfections from this source is minimized.

The enveloping fine glass fiber material of the form shown in Figs. 3 and 4 may, if desired, be made in the form of a strip and applied in the same manner as the aluminum foil shown in Fig. 2. In the particular form shown, however, the relatively large sheet of the material 14 is employed and the batt 13 is completely wrapped in this sheet in the manner illustrated in Fig. 4.

As in the case of the form of the invention shown in Fig. 2, the form shown in Fig. 4 has an auxiliary advantage in that the relatively fine glass fiber material is less irritating to the skin, and hence the composite filler structure can be more readily handled.

While I have shown and described specific embodiments of my invention, I do not desire my invention to be limited to the particular construction shown and described, and I intend by the appended claims to cover all modifications within the spirit and scope of my invention.

What I claim as new and desire to secure by Letters Patent of the United States is:

1. An insulating structure of a vacuum type comprising a pair of spaced walls having abutting edges, said edges being welded to provide a vacuum-tight sealed envelope, filler material in the space between said walls for supporting said walls against external atmospheric pressure, said filler material consisting of a batt of relatively coarse glass fiber material forming the major portion thereof, and a thin strip of relatively fine glass fiber material in which the glass fibers have a diameter not exceeding .0002 inch enclosing at least the edges of said batt for minimizing entry of glass shot and fibers from said batt into the weld area.

2. An insulating structure of a vacuum type comprising a pair of spaced walls having abutting edges, said edges being welded to provide a vacuum-tight sealed envelope, filler material in the space between said walls for supporting said walls against external atmospheric pressure, said filler material consisting of a batt of relatively coarse glass fiber forming the major portion thereof, and a thin sheet of relatively fine glass fiber material in which the glass fibers have a diameter not exceeding .0002 inch wrapped about said batt and completely enclosing said batt for minimizing entry of glass shot and fibers from said batt into the weld area.

References Cited in the file of this patent

UNITED STATES PATENTS

| Number | Name | Date |
|---|---|---|
| 903,878 | Mock | Nov. 17, 1908 |
| 1,554,395 | Young | Sept. 22, 1925 |
| 1,898,977 | Comstock | Feb. 21, 1933 |
| 1,927,879 | Spafford | Sept. 26, 1933 |
| 1,971,064 | Corlette et al. | Aug. 21, 1934 |
| 1,992,509 | Slidell | Feb. 26, 1935 |
| 2,113,068 | McLaughlin | Apr. 5, 1938 |
| 2,264,543 | Nauert | Dec. 2, 1941 |
| 2,495,636 | Hoeltzel et al. | Jan. 24, 1950 |
| 2,504,421 | Johnson et al. | Apr. 18, 1950 |
| 2,540,563 | Workman | Feb. 6, 1951 |
| 2,552,124 | Tallman | May 8, 1951 |